US012631517B2

(12) United States Patent     (10) Patent No.:     US 12,631,517 B2
Vo et al.                         (45) Date of Patent:        May 19, 2026

(54) AIR GUN SHOCK TEST APPARATUS

(71) Applicant: Raytheon Company, Waltham, MA (US)

(72) Inventors: Peter H. Vo, Oro Valley, AZ (US); Michael Klensin, Tucson, AZ (US); Roger C. Esplin, Marana, AZ (US); Steven Alejandro Elmer, Tucson, AZ (US); James Paul Henderson, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 275 days.

(21) Appl. No.: 18/354,992

(22) Filed: Jul. 19, 2023

(65) Prior Publication Data

US 2025/0027837 A1     Jan. 23, 2025

(51) Int. Cl.
*G01N 3/307*          (2006.01)
*G01M 7/08*           (2006.01)
(52) U.S. Cl.
CPC .............. *G01M 7/08* (2013.01); *G01N 3/307* (2013.01)
(58) Field of Classification Search
None
See application file for complete search history.

(56) References Cited

U.S. PATENT DOCUMENTS

| | | | |
|---|---|---|---|
| 2,537,096 A | 1/1951 | Shreeve et al. | |
| 10,215,674 B2 * | 2/2019 | Sweet | G01N 3/307 |
| 2024/0088933 A1 * | 3/2024 | Kim | H02J 50/10 |
| 2025/0347599 A1 * | 11/2025 | Schwab | G01N 3/04 |

FOREIGN PATENT DOCUMENTS

| | | | | |
|---|---|---|---|---|
| CN | 101487781 B | | 4/2011 | |
| CN | 108333040 A | | 7/2018 | |
| CN | 210626237 U | * | 5/2020 | |
| CN | 112198046 A | * | 1/2021 | ............... G01N 3/04 |
| CN | 113029824 A | * | 6/2021 | ............... G01N 3/30 |
| CN | 216433704 U | | 5/2022 | |
| KR | 20180008344 A | | 1/2018 | |

OTHER PUBLICATIONS

Title: "Split-Hopkinson Pressure Bar Tests"; URL: https://apps.dtic.mil/sti/html/tr/ADA242549/; Relevant pp. 10-11 (Year: 1989).*
International Search Report and Written Opinion for PCT Application No. PCT/US2024/028624, Dated Aug. 12, 2024, 12 Pages.
(Continued)

*Primary Examiner* — Douglas X Rodriguez
*Assistant Examiner* — Ruben C Parco, Jr.
(74) *Attorney, Agent, or Firm* — Kinney & Lange, P.A.

(57)          ABSTRACT

A test assembly and method for performing a shock test of an article includes a pneumatic gun assembly, a Hopkinson bar assembly, a magnetic catch, and a support assembly. The support assembly suspends the article in alignment with the magnetic catch. The magnetic catch retains the article against the Hopkinson bar assembly. The pneumatic gun assembly includes a striker for propagating a shock through the Hopkinson bar assembly into the article.

10 Claims, 5 Drawing Sheets

(56) References Cited

OTHER PUBLICATIONS

H.T. Nagamatsu et al., "An Experimental Investigation of the Gasdynamic Performance of Gun Bore Evacuators Mounted on 155-MM Self-Propelled Howitzers", Contractor Report ARCCB-CR-95019, Rensselaer Polytechnic Institute Troy, New York, Mar. 1995, pp. 82.

Jerome T. Tzeng et al., "An Experimental Method for Dynamic Properties of Composites at Interior Ballistic Rates of Loading", ARL-TR-696, Army Research Laboratory, Feb. 1995, pp. 36.

Kazuaki Inaba et al., " Plastic Deformation and Vibration in a Fluid-Filled Tube Subject to Axial Impact," Proceedings of 2009 ASME Pressure Vessels and Piping Division Conference, PVP2009, Jul. 26-30, 2009, Prague, Czech Republic, pp. 12.

* cited by examiner

AIR GUN SHOCK TEST APPARATUS

STATEMENT OF GOVERNMENT INTEREST

This invention was made with government support DOTC 19-01-INIT0492 awarded by the Office of the Secretary of Defense. The government has certain rights in the invention.

BACKGROUND

The present disclosure relates generally to shock testing an article, and more particularly to a method and assembly for performing a shock test using a single Hopkinson bar.

Evaluating articles for shock performance is a common test procedure for designs that are intended to survive shock loads. In certain applications, an article can be designed to survive high g-loads. Once such article is a projectile or munition. When a projectile is fired from a weapon system, the projectile must survive high g-loads from the firing process. Currently, shock loads are evaluated by firing an instrumented projectile from an actual weapon system. In such test apparatuses, the projectile velocity is arrested by firing the projectile into a catch system to decelerate the projectile, imposing additional loads on the projectile unrelated to the actual shock event.

SUMMARY

A test assembly according to an example of this disclosure includes a pneumatic gun assembly, a Hopkinson bar assembly, a ferrous end plate, and a magnetic catch. The pneumatic gun assembly includes a reservoir, a gun tube with a discharge end, a seat spaced from the discharge end, and a striker abutting the seat. The ferrous plate attaches to the article and the magnetic catch couples the ferrous end plate to the output end of the Hopkinson bar assembly.

A method of shock testing an article according to an example of this disclosure includes coupling a magnetic catch to a ferrous end plate in which the ferrous end plate is attached to the article. The method includes discharging a pneumatic gun assembly to propel a striker into an input end of a Hopkinson bar assembly comprising a single multi-section shaft. The method includes computing a shock response spectrum based on data received from a triaxial accelerometer attached to the article. The data represents a shock imposed on the article generated by the striker impacting the Hopkinson bar assembly.

DETAILED DESCRIPTION

Figure 1:
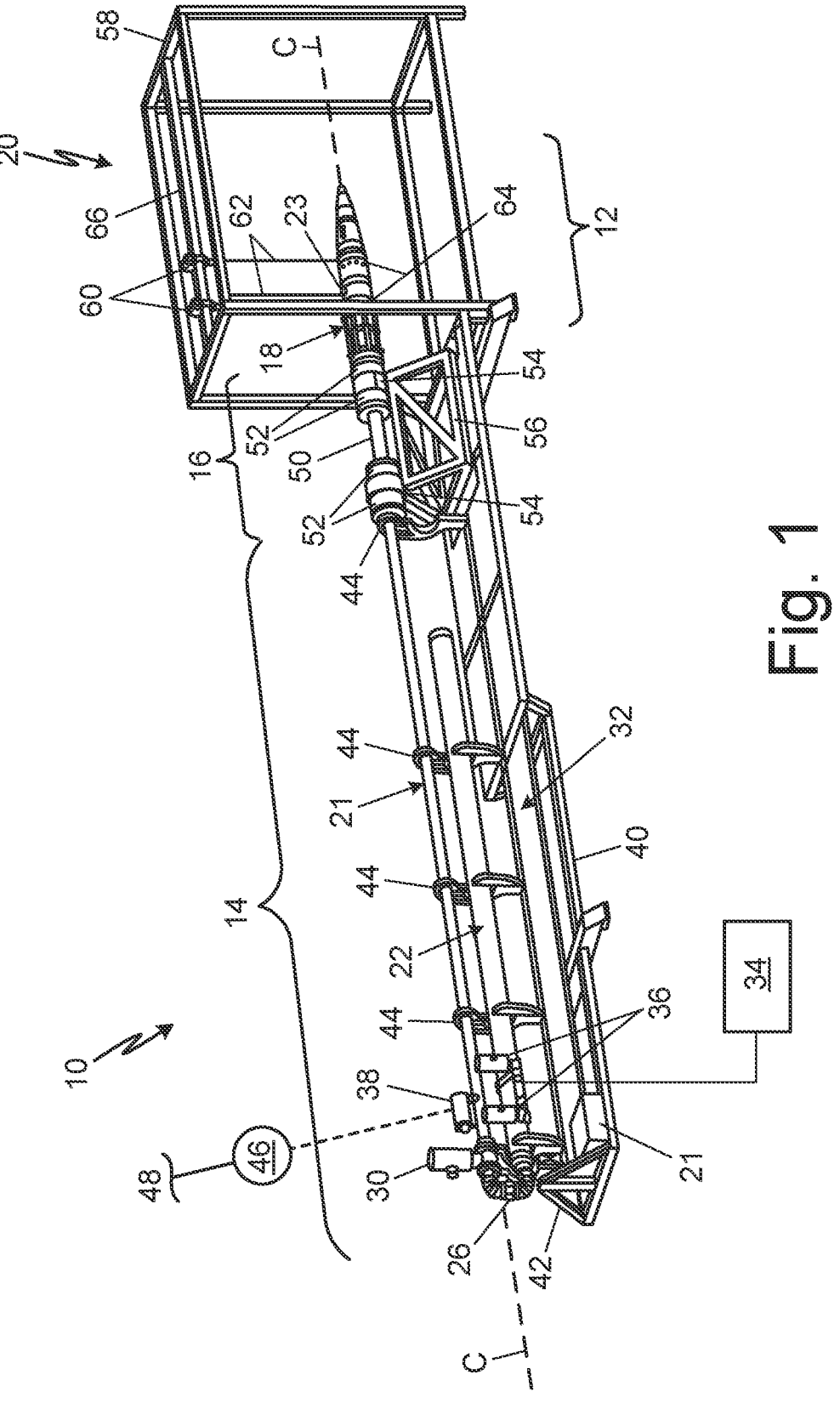
FIG. 1 is an isometric view of an example test assembly for performing a shock test of an article.

FIG. 1 is an isometric view of test assembly 10 for performing a shock test of article 12. Test assembly 10 includes pneumatic gun assembly 14, Hopkinson bar assembly 16, magnetic catch 18, support assembly 20, and control system 21. During a shock test, article 12 is suspended from support assembly 20 and coupled to magnetic catch 18. Magnetic catch 18 draws article 12 in contact with Hopkinson bar assembly 16. Pneumatic gun assembly 14 discharges a striker into Hopkinson bar assembly 16, propagating shock waves through Hopkinson bar assembly 16 into article 12. Article 12 uncouples from magnetic catch 18 from the shock while support assembly 20 guides article 12 axially until article 12 decelerates to rest (i.e., zero axial velocity). Control system 21 determines a shock response spectrum from data received from one or more accelerometers 23 attached to or imbedded in article 12. Control system 21 compares the shock response spectrum to an acceptance criterion or acceptance criteria and outputs an indication of acceptance or failure of article 12. Test assembly 10 permits evaluation of article 12 after application of a shock representative of a real-world shock event without subjecting article 12 to additional loads that are not associated with the real-world shock event, but are necessary to perform the shock test.

For example, article 12 can be a projectile or munition designed to be fired from a weapon system. Test assembly 10 permits article 12 (e.g., a projectile or munition) to be subjected to a shock representative of firing article 12 from the weapon system without actual discharge from the weapon system. As such, the catchment system designed to arrest article 12 after launch is unnecessary, and test assembly 10 does not subject article 12 to additional loads imposed by the catchment system. While the following test assembly 10 is described in context of article 12 being a projectile or munition, it should be understood that test assembly 10 is useful for any article 12 in which the shock test procedure imposes additional load on article 12 not experienced during an actual shock event.

Pneumatic gun assembly 14 includes reservoir 22, gun tube 24, pneumatic connection 26, striker 28, firing valve 30, main support frame 32, and gas source 34. In some examples, pneumatic gun assembly 14 includes one or more reservoir valves 36, at least one vacuum valve 38, or one or more reservoir valves 36 and one or more vacuum valves 38.

Reservoir 22 is a pressure vessel that is designed to store pressurized gas and discharge pressurized gas through gun tube 24. In some examples, reservoir 22 contains pressurized gas in excess of 35.5 kPa (or about 5 psig) gage pressure. In other examples, reservoir 22 may contain pressurized gas in excess of 50.0 kPa (or about 7.5 psig). In still other examples, reservoir 22 may contain pressurized gas in excess of 70.0 kPa (or about 10.0 psig). In some examples, the maximum gas pressure can be 100 kPa (or about 14.5 psig). However, reservoir 22 can be constructed to contain higher gas pressures if necessary, limited by known engineering practices.

Reservoir 22 fluidly connects to gas source 34. Gas source 34 can be any pressurized source of air or other gas. For example, gas source 34 can include a compressor that pressurizes ambient air for storage within reservoir 22. In other examples, gas source 34 can be another pressure vessel or pressure vessels capable of storing a larger quantity of gas at a higher storage pressure relative to reservoir 22. In such cases, such pressurized gas storage can be replenished with via a compressor.

Gun tube 24 is a longitudinal body defining a cylindrical bore. Gun tube 24 extends from firing valve 30 to a discharge end at Hopkinson bar assembly 16. The cylindrical bore of gun tube 24 pneumatically connects with reservoir 22. Gun tube 24 and its bore can be offset from and extend parallel to a longitudinal dimension of reservoir 22 as shown in FIG. 1. In such examples, pneumatic connection 26 includes piping consisting of elbows, fittings, and/or straight pipe sections to fluidly connect an outlet of reservoir 22 to an inlet of gun tube 22. In other examples, gun tube 24 can be perpendicular to reservoir 22 or oriented at an oblique angle to a longitudinal dimension of reservoir 22. In still other examples, reservoir 22 and gun tube 24 can be coaxial to define an inline configuration of pneumatic gun assembly 14.

Striker 28 is a cylindrical body adapted to be received within the bore of gun tube 24. In some examples, striker 28 includes cylindrical lands, which have a greater diameter than a main body of striker 28 to engage a bore of gun tube 24. The diameters of the cylindrical lands define location fits with the bore of gun tube 24 and are spaced axially along striker 28 to guide striker 28 along the bore of gun tube 24 during a shock test.

Firing valve 30 is a valve with at least two positions, a pre-firing position and a firing position. In the pre-firing position, firing valve 30 is closed, blocking communication between reservoir 22 and gun tube 24. In the firing position, firing valve 30 is open or partially open, fluidly connecting reservoir 22 to gun tube 24 and discharging pressurized gas stored within reservoir 22 through gun tube 24. In some examples, firing valve 30 is a two-position solenoid valve with at most a fraction of a second response time between the pre-firing position and the firing position. In other examples, firing valve 30 can be a needle valve, a gate valve, a ball valve, or other valve type with suitable response time.

Main support frame 32 supports components of gun tube assembly 14, including any of the additional components discussed herein. Main support frame 32 includes base frame 40, pedestal truss 42, and/or one or more brackets 44. Base frame 40 is a structure that mounts pneumatic gun assembly 14 to the ground, a foundation, or other stationary structure. Pedestal truss 42, if present, is a welded triangular truss structure that extends from base frame 40 to support reservoir 22 and/or gun tube 24. Brackets 44 are plates that can extend from base frame 40 to support reservoir 22 and/or gun tube 24.

As depicted in FIG. 1, main support frame 32 includes base frame 40, pedestal truss 42, and multiple brackets 44. Base frame 40 is a welded, rectangular structure forming a base of pneumatic gun assembly 14. Pedestal truss 42 extends from an end of base frame 40 to support pneumatic gun assembly 14 in the vicinity of pneumatic connection 26. Brackets 44 are spaced from pedestal truss 42 along base frame 40 at a suitable interval to prevent bending or other mechanical deflections that may interfere with or affect operation of pneumatic gun assembly 14. Brackets 44, as depicted in FIG. 1, are adapted to support both reservoir 22 and gun tube 24, which includes two circular cutouts, each cutout conforming to an outer periphery of reservoir 22 or gun tube 24.

In some examples, pneumatic gun assembly 14 includes one or more reservoir valves 36. Each reservoir valve 36 includes an open position and a closed position. In the open position, reservoir 22 is fluidly connected to gas source 34, or to an ambient environment (e.g., a vent). In the closed position, reservoir 22 is fluidly disconnected from gas source 34, or from the ambient environment. The size and number of reservoir valves 36 are determined by the desired mass flow rate for recharging reservoir 22. In some examples, one or more reservoir valves 36 are used to fill reservoir 22 via gas source 34 and one or more reservoir valves 36 are used to remove pressurized gas from reservoir 22 to the ambient environment. As depicted in FIG. 1, pneumatic gun assembly 14 can include two reservoir valves 36 arranged in parallel to fill reservoir 22. In other examples, pneumatic gun assembly 14 can include more than two reservoir valves 36. Reservoir valve 36, or valves 36, can be any suitable valve size and type. For example, reservoir valve 36 can be a solenoid valve, a needle valve, a butterfly valve, a gat valve, or other type of valve suitable for selectively connecting reservoir 22 to gas source 34.

Pneumatic gun assembly 14 can include vacuum valve 38 for evacuating gas from the bore of gun tube 24. Vacuum valve 38 communicates with the bore of gun tube 24 at a location between a seat for striker 28 and firing valve 30, or reservoir 22. In an open position, vacuum valve 38 fluidly connects the bore of gun tube 24 to vacuum pump 46 and vent 48 to evacuate gas from within the gun tube bore. In a closed position, vacuum valve 38 disconnects the bore from vacuum pump 46 and vent 48. Examples of pneumatic gun assembly 14 incorporating vacuum valve 38, vacuum pump 46, and vent 48 enable vacuum pump 46 to draw a vacuum pressure (i.e., a negative gage pressure) on striker 28 after firing pneumatic gun assembly 14 as described below.

Hopkinson bar assembly 16, when impacted by striker 28 fired from pneumatic gun assembly 14, transmits a shock into article 12. Hopkinson bar assembly 16 includes a single multi-section shaft 50, mounts 52, split sleeves 54, and stationary structure 56. Contrary to a split Hopkinson bar setup, test assembly 10 transmits a shock wave into a single side of article 12, rather than from two opposing sides. Shaft 50 is a solid, cylindrical shaft that extends from an input end at gun tube 24 to an output end abutting article 12 in a pre-fire condition. Shaft 50 has length L measured from the input end to the output end and at least diameter D1. In some embodiments, shaft 50 includes multiple sections, each section characterized by a length segment and diameter. The length L, diameter D1, and modulus of elasticity E of shaft 50 are selected to transmit a shock of a target amplitude and frequency band into article 12. For example, shaft 50 is constructed from steel, having a modulus of elasticity between 180 MPa and 200 MPa (or about 26.1 ksi to 29.0 ksi), and has length L equal to 1.2 meters (or about 4 feet). With these parameters, shaft 50 can transmit a shock into article 12 having a frequency band between 100 Hz and 100,000 Hz and with a peak-to-peak amplitude between 10 g's and 100,000 g's. Mounts 52 support shaft 50. Split sleeves 54 circumscribe mounts 52 and, along with stationary structure 56, restrain shaft 50 as discussed further below.

Magnetic catch 18 couples Hopkinson bar assembly 16 to article 12 in a pre-fire condition. After firing pneumatic gun assembly 14, shock transmitted through Hopkinson bar assembly 16 into article 12 decouples magnetic catch 18 from article 12. Magnetic catch 18 draws article 12 against output end of multi-section shaft 50 to ensure efficient and repeatable transmission of shock into article 12 while allowing article 12 to separate from magnetic catch 18 after shock transmission.

Support assembly 20 further isolates article 12 from test assembly 10 to ensure shock response spectrum acquisition with minimal interference from test assembly 10. Support assembly 20 includes frame 58, rollers 60, suspension lines 62, and split rings 64. Frame 58 is a structure constructed as a steel weldment and/or bolted steel assembly that supports article 12 during a shock test. Frame 58 includes central beam 66 for suspending article 12 along centerline C of test assembly 10. Rollers 60 engage central member 66 and are free to translate along central member C during the shock test. Suspension lines 62 connect rollers 60 to split rings 64, which are assembled about article 12 for support. During a shock test, shock imposed into article 12 causes article 12 to separate from magnetic catch 18. After separation, article 12 displaces along centerline C of test assembly 10 while supported and guided by rollers 60, suspension lines 62, and split rings 64. Additional lines (not shown in FIG. 1) may loosely attach article 12 to frame 58 to prevent excessive lateral displacement of article 12 during the shock test.

Article 12 is any article for which shock testing can be performed by test assembly 10. One or more accelerometers 23 are attached to an outer periphery of article 12 and/or imbedded within article 12 to capture data from which shock response spectrum can be determined. For example, accelerometers 23 can include a single axis accelerometer and/or a multi-axis accelerometer (e.g., a triaxial accelerometer) that output a signal or signals representative of axial acceleration of article 12 along centerline axis C, lateral acceleration perpendicular to centerline axis C, and/or vertical acceleration of article 12. In some examples, one or more accelerometers 23 can be orientated to provide axial acceleration data, lateral acceleration perpendicular to centerline axis C and gravity, and/or vertical acceleration perpendicular to centerline axis C and parallel to gravity (i.e., vertical acceleration data). In another example, one or more accelerometers 23 can be oriented to provide lateral acceleration data at oblique angles to gravity. The location and number of accelerometers can be selected in order to closely mimic data obtained during actual shock events. For instance, one or more accelerometers 23 can be collocated or located proximate to a center of gravity of article 12.

Figure 2:
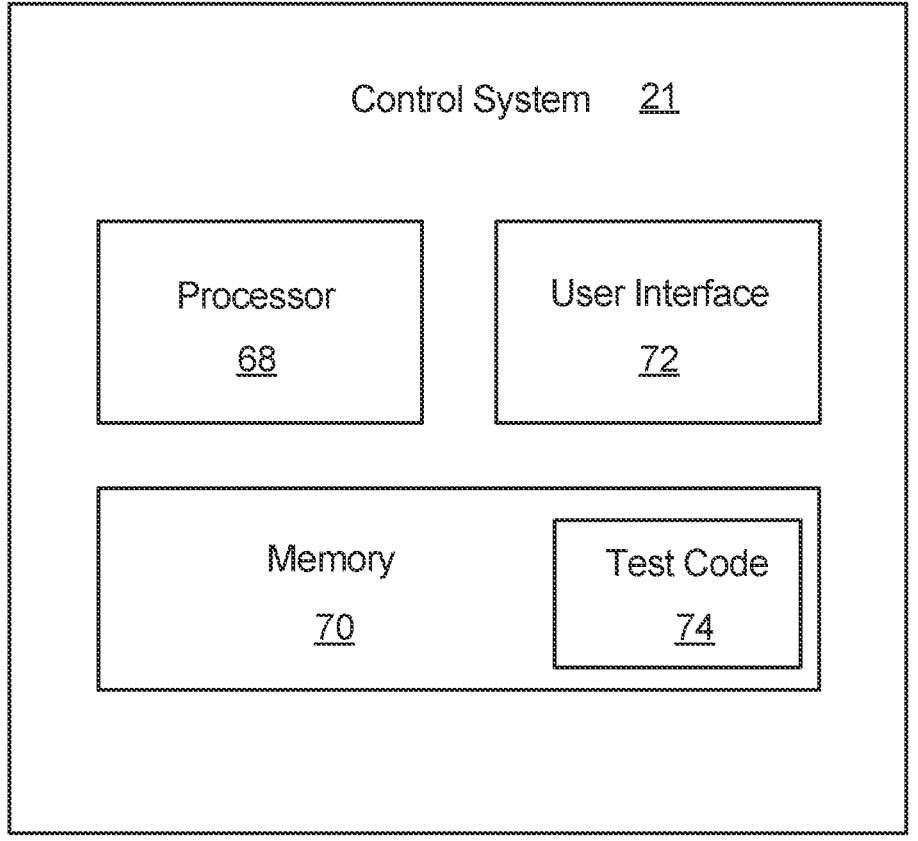
FIG. 2 is a block diagram describing a control system for the test assembly of FIG. 1.

Control system 21 is a computing device that performs shock test by controlling reservoir pressure, valve position, and/or performs data equation of one or more accelerometer signals. As shown in FIG. 2, control system 21 includes at least one processor 68, memory 70, and user interface 72. Test code 74 can be stored by memory 70 and includes one or more modules configured to perform a shock test. Control system 21 can perform a shock test automatically in some examples. In other examples, control system 21 can perform one or more steps of the shock test upon receiving operator input via user interface 72.

Processor 68 can execute test code 74 and other software, applications, and/or programs stored on memory 70. Examples of processor 68 can include one or more of a processor, a microprocessor, a controller, a digital signal processor (DSP), an application specific integrated circuit (ASIC), a field-programmable gate array (FPGA), or other equivalent discrete or integrated logic circuitry. Processor 68 can be entirely or partially mounted on one or more circuit boards.

Memory 70 is configured to store information and, in some examples, can be described as a computer-readable storage medium or computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 70 is a temporary memory. As used herein, a temporary memory refers to a memory having a primary purpose that is not long-term storage. Memory 70, in some examples, is described as volatile memory. As used herein, a volatile memory refers to a memory that the memory does not maintain stored contents when power to the memory 70 is turned off. Examples of volatile memories can include random access memories (RAM), dynamic random access memories (DRAM), static random access memories (SRAM), and other forms of volatile memories. In some examples, memory 70 is used to store program instructions for execution by processor 68. Memory 70, in one example, is used by software, applications, or data models running on the application modernization assessment system 100 (e.g., by a computer-implemented data processing module) to temporarily store information during program execution.

Memory 70, in some examples, also includes one or more computer-readable storage media. The memory can be configured to store larger amounts of information than volatile memory. The memory can further be configured for long-term storage of information. In some examples, the memory includes non-volatile storage elements. Examples of such non-volatile storage elements can include, for example, magnetic hard discs, optical discs, floppy discs, flash memories, or forms of electrically programmable memories (EPROM) or electrically erasable and programmable (EE-PROM) memories.

User interface 72 is an input and/or output device. For example, user interface 72 can be configured to input test parameters (e.g., reservoir pressure), initiate and terminate shock test, and/or initiate pressurization of reservoir 22. User interface 72 can include one or more of a sound card, a video graphics card, a speaker, a display device (such as a liquid crystal display (LCD), a light emitting diode (LED) display, an organic light emitting diode (OLED) display, etc.), a vibration or rumble motor, an accelerometer, a touchscreen, a keyboard, a mouse, a joystick, or other type of device for facilitating input and/or output of information in a form understandable to users and/or machines.

Control system 21 can be a discrete assembly as shown in FIG. 1 or be formed by one or more devices capable of individually or collectively implementing functionalities and generating and outputting data as discussed herein. In some examples, control system 21 can be implemented as a plurality of discrete circuitry subassemblies. In some examples, control system 21 can include or be implemented at least in part as a computer, smartphone or tablet, among other options. Control system 21 can be considered to form a single computing device even when distributed across multiple component devices.

Test assembly 10, under direction of control system 21 and/or an operator, is configured to perform one or more methods described herein. Control system 21 can accept data from and/or can be operably connected to a server and/or a database. Control system 21 can use data from the server and/or database to assess shock test parameters and/or shock spectrum response data. More generally, control system 21 is configured to perform any of the functions attributed herein to test assembly 10, including receiving an output from any source referenced herein and generating and providing data and information as referenced herein.

Figure 3:
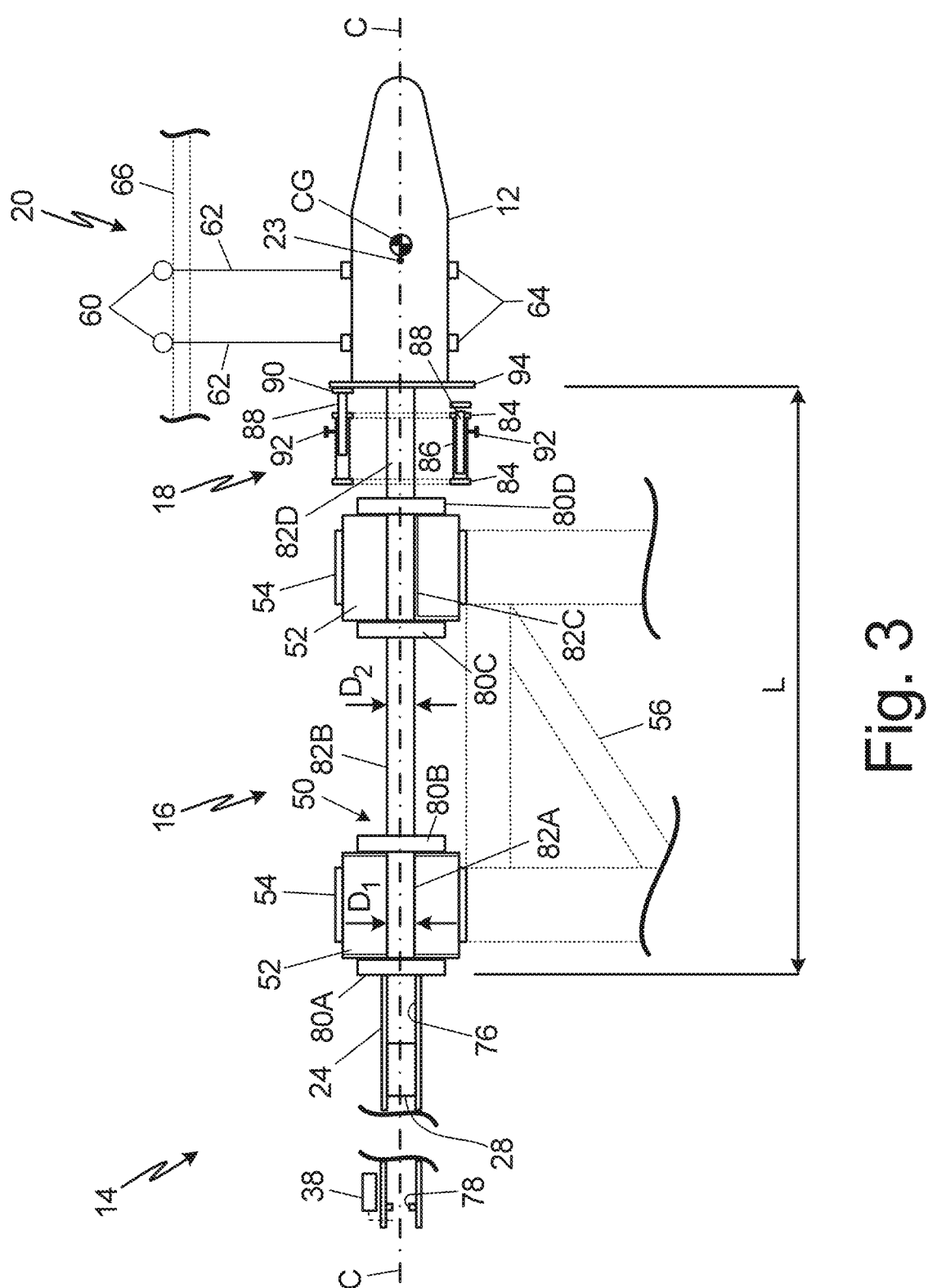
FIG. 3 is a partial cross-section of the test assembly of FIG. 1.

FIG. 3 is a cross-sectional view of a portion of test assembly 10 taken along centerline axis C. A discharge end of pneumatic gun assembly 14. Hopkinson bar assembly 16, magnetic catch 18, article 12, and a portion of support assembly 20 are shown. Depicted components of pneumatic gun assembly 14 include a discharge end of gun tube 24, cylindrical bore 76, seat 78, striker 28, and vacuum valve 38. As shown, striker 28 is received within cylindrical bore 76 of gun tube 24. Seat 78 is positioned proximate vacuum valve 38 within bore 76 to provide a stop for striker 28 in a pre-fired condition.

Hopkinson bar assembly 14 is shown by FIG. 3 in greater detail. Multi-section shaft 50, mounts 52, split sleeves 54 are shown. Stationary structure 56 is represented by dashed lines. Multi-section shaft 50 extends length L from input end adjacent gun tube 24 to output end in contact with article 12 in the pre-firing condition. As depicted, multi-section shaft 50 includes multiple disk sections 80A-D and multiple cylindrical sections 82A-D. Disk sections 80A-D have a greater diameter-to-length ratio than cylindrical sections 82A-D. Disk sections 80A-D are characterized by a diameter-to-length ratio greater than one while cylindrical sections 82A-D have diameter-to-length ratios less than or equal to one. Cylindrical sections 82A-D can have the same diameter D1 or different diameters (e.g., D1 and D2). Mounts 52 circumscribe respective cylindrical sections 82A and 82C of multi-section shaft 50 for support. Disk sections 80A and 80B are disposed on either side of mount 52A while disk sections 80C and 80D are disposed on either side of mount 52B. Together, disk sections 80A-D axially restrain multi-section shaft 50 with respect to mounts 52A-B. Split sleeves 54 are assembled about mounts 52A-B, which laterally restrain mounts 52A-B and shaft 50 with respect to stationary structure 56 (i.e., perpendicularly to centerline B).

Mounts 52A-B are configured to support multi-section shaft 50 while allowing relative displacement between shaft 50 and stationary frame 56. Mounts 52A-B have lateral stiffness and axial stiffness that are sufficient less than corresponding stiffnesses of shaft 50 to isolate displacement of shaft 50 from stationary structure 56. For example, mounts 52A-B can be constructed from a material with a modulus of elasticity $E_m$ that is one or more orders of magnitude smaller than a modulus of elasticity $E_s$ shaft 50. In one example, shaft 50 can be steel, and mounts 52A-B can be a resilient material (e.g., rubber) having a modulus of elasticity less than 1.0 MPa (or less than 145 psi).

Magnetic catch 18 couples multi-section shaft 50 to article 12. Magnetic catch 18 includes end rings 84, tubes 86, bars 88, magnets 90, and fasteners 92. End rings 84 are annular members spaced on either end of magnetic catch 18. Tubes 86 extend between end rings 84 to define a skeletal frame of magnetic catch 18. Bars 88 extend through openings in one of end rings 84 and are received within respective tubes 86. Magnets 90 attach to respective distal ends of bars 88. Tubes 86, bars 88, and magnets 90 are circumferentially spaced about centerline C. While two sets of tubes 86, bars 88, and magnets 90 are shown, magnetic catch 18 can have any suitable number of sets required to achieve an evenly distributed retention of article 12. Bars 88 and magnets 90 are adjustable along centerline C to align magnets 90 within a plane normal to centerline C. Axial positions of bars 88 and magnets 90 are fixed using fasteners 92, or another mechanical means. The upper bar 88 and magnet 90 are shown engaged to article 12 while the lower bar 88 and magnet 90 are depicted in a retracted position to illustrate the translation of bars 88 and magnets 90. Prior to the shock test, article 12 is suspended from support assembly 20 brought into engagement with magnetic catch 18.

Article 12 includes ferrous end plate 94 and one or more accelerometers 23. Ferrous end plate 94 is attached to end of article 12 to facilitate coupling with magnetic catch 18. In the depicted example, at least one accelerometer 23 (e.g., a triaxial accelerometer) is installed within article 12 proximate to center of gravity CG. Article 12 is shown suspended from central beam 66 of support assembly 20 by rollers 60, suspension lines 62, and split rings 64. During a shock test, striker 28 is propelled by pneumatic gun assembly 14 towards multi-section bar 50. Impact of striker 28 with multi-section shaft 50, which in the depicted example is disk section 80A, produces a shock that propagates through shaft 50 into article 12. Article 12 uncouples from magnetic catch 18. Control system 21 captures data from accelerometers 23 and determines shock response spectrum in three mutually orthogonal axes (e.g., the axial direction and two orthogonal lateral directions).

Figures 4A, 4B, 4C:
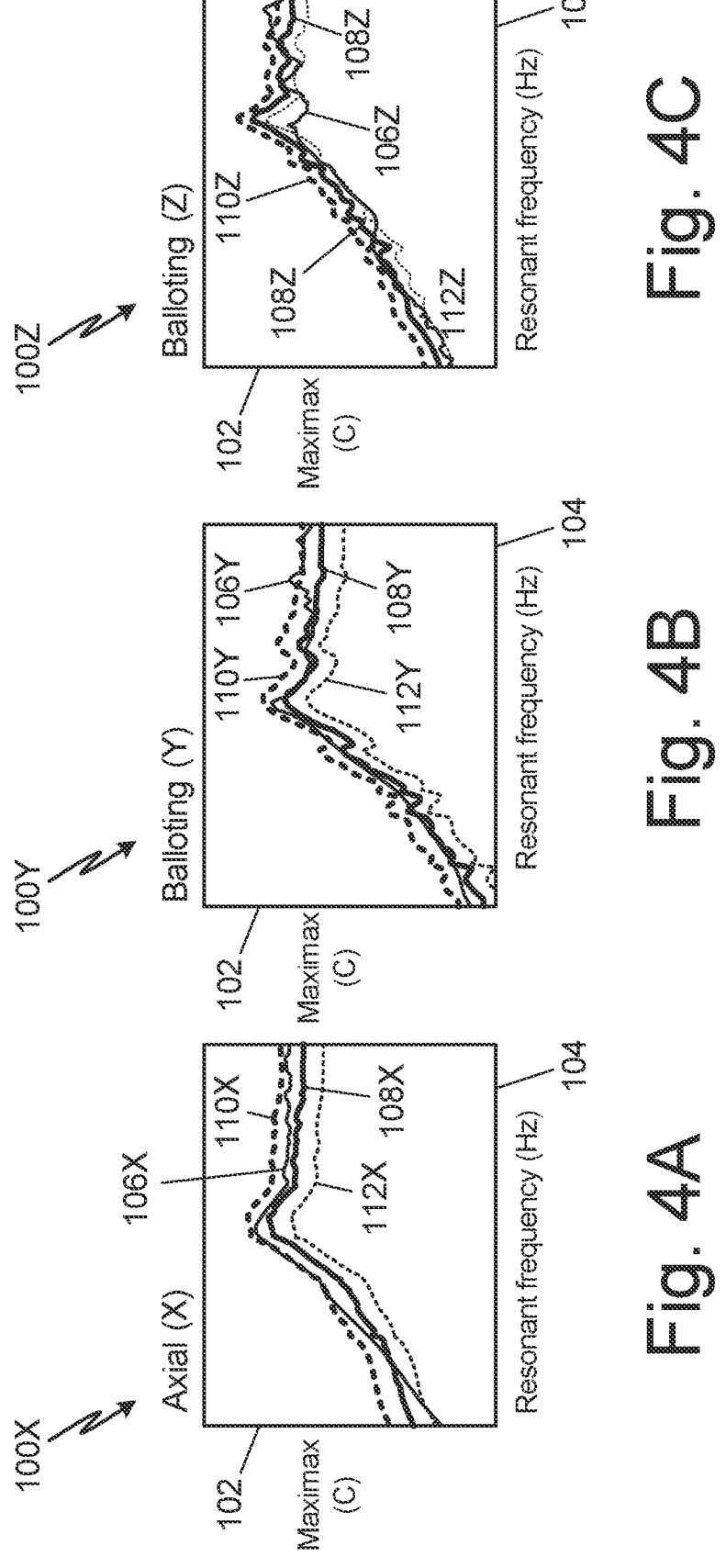
FIGS. 4A, 4B, and 4C are graphs depicting example test response spectra from the test assembly of FIG. 1.

FIGS. 4A, 4B, and 4C are graphs depicting example shock response spectrum produced by test assembly 10 and an analogous actual shock event. Each graph depicts resonant frequency (Hz) along abscissa 102 of respective graphs using a logarithmic scale. The ordinate 104 of respective graphs depict maximum shock response amplitude as a function of resonant frequency (maximax) expressed by a logarithmic scale.

FIG. 4A depicts example shock response spectra of article 12 in the axial or longitudinal direction. FIG. 4B depicts example shock response spectra of article 12 in a lateral direction. FIG. 4C depicts example shock response spectra of article 12 in a vertical direction. In each of FIGS. 4A, 4B, and 4C, test shock response spectra 106X, 106Y, and 106Z and actual response spectra 108X, 108Y, and 108Z are shown. In order to validate that test assembly 10 produces shocks representative of an actual shock event, upper limit spectra 110X, 110Y, and 110Z and lower limit spectra 112X, 112Y, and 112Z are defined by offsetting actual response spectra 108X. 108Y, and 108Z plus and minus tolerance T. In some examples, tolerance T is equal to +/−6 dB. In other examples, a smaller or larger tolerance T can be used. Upper limit spectra 110X, 110Y, and 110Z and lower limit spectra 112X, 112Y, and 112Z are criteria for validating test assembly 10. Shocks produced by test assembly 10 are representative of actual shocks when, for a target percentage of a test frequency band, test shock response spectra 106X, 106Y, and 106Z are less than or equal to respective upper limit spectra 110X, 110Y, and 110Z and greater than or equal to respective lower limit spectra 112X, 112Y, and 112Z.

Figure 5:
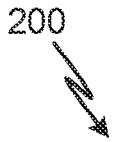
FIG. 5 is a flow chart describing a method for performing a shock test using the test assembly of FIG. 1.
Figure 5:
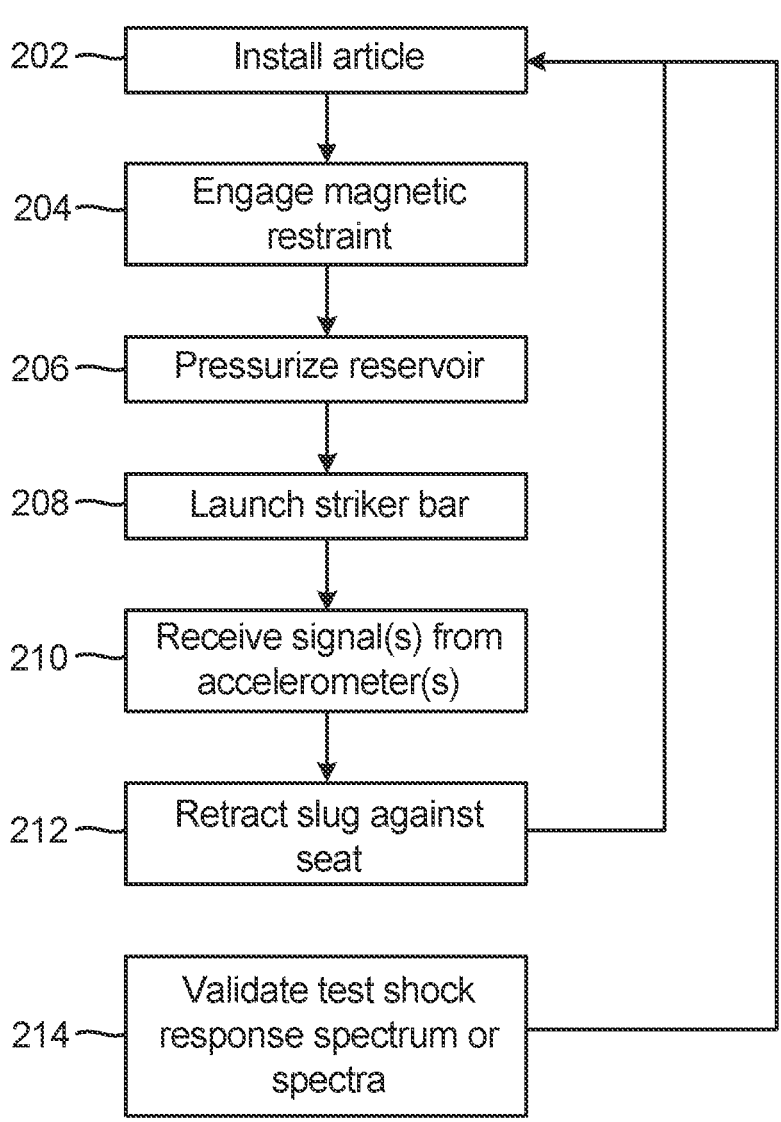

FIG. 5 is a flow chart describing method 200, a process for shock testing article 12. Method 200 includes steps 202, 204, 206, 208, 210, and 212. In some examples, method 200 includes step 214. The sequence depicted is for illustrative purposes only and is not meant to limit method 200 in any way as it is understood that the portions of the method can proceed in a different logical order, additional or intervening portions can be included, or described portions of the method can be divided into multiple portions, or described portions of the method can be omitted without detracting from the described above. Further, the following description assumes striker 28 has been drawn against seat 78 in a pre-firing condition.

In step 202, an operator installs article 12 into test assembly 10. Installation of article 12 can include attaching ferrous plate 94 to the end of article 12. Ferrous plate 94 can be fastened to article 12 via a preexisting thread pattern, if available, or by any other suitable mechanical means. In some examples, article 12 may include a ferrous end of sufficient size and position to couple article 12 to magnetic catch 18 without ferrous plate 94. Installation of article 12 includes attaching split rings 64 about article 12 and connecting suspension lines 62 to spilt rings 64 and rollers 60. Further, the length of suspension lines 62 can be selected or adjusted to align a geometric center of article 12 with centerline C of test assembly 10. Installation of article 12 further includes attaching at least one accelerometer 23 to a periphery of article 12 or imbedded or attached within article 12.

In step 204, the operator engages magnetic catch 18 to couple article 12 to shaft 50. Engaging magnetic catch 18 can include aligning ferrous plate 94 or a ferrous end of article 12 with magnets 90 of magnetic catch 18. This process can further include adjusting bars 88 and magnets 90 such that a common, article-facing surface of magnets 90 are coplanar. Once magnets 90 are coplanar, restraining bars 88 and magnets 90 are axially restrained using fasteners 92, or another mechanical means. Article 12 couples to magnetic catch 18 by bringing article 12 into contact with magnets 90.

In step 206, the operator pressurizes reservoir 22 to a target pressure. The target pressure, geometry and material of shaft 50, and mass of striker 28 are selected to produce a desired shock impulse at article 12. For instance, the target pressure can be 55.2 kPa (or about 8 psig). During pressurization of reservoir 22, firing valve 30 and vacuum valve 38 are closed while reservoir valves 36 are open. Once reservoir 22 attains the target pressure, reservoir valves 36 are closed.

In step 208, the operator and/or control system 21 fires striker 28 of pneumatic gun assembly 14. Firing striker 28 includes actuating firing valve 30 to the open position or a partially open position, which can be accomplished manually or via user interface 72 of control system 21 by operator. With the firing valve 30 in the open position, pressurized gas within reservoir 22 discharges through pneumatic connection 26 and gun tube 24 and propels striker 28 into shaft 50. As a result of the impact, a shock wave propagates through shaft 50 into article 12. Article 12 uncouples from magnetic couple 18 and displaces along centerline C under action of the shock.

In step 210, control system 21 receives acceleration data from one or more accelerometers 23. Control system 21 processes acceleration data to produce test response spectra in each of three mutually orthogonal directions according to known techniques.

In step 212, striker 28 is retracted against seat 78 to prepare pneumatic gun assembly 14 for a subsequent shock test. Retracting striker 28 can include actuating firing valve 30 to the closed position and opening vacuum valve 38. In this state, reservoir valves 36 can be in an open state such that step 206 is performed concurrently with step 212. Alternatively, reservoir valves 36 can be in a closed state such that step 206 occurs during or just prior to a subsequent shock test. With vacuum valve open, vacuum pump operates to produce a vacuum pressure within the bore of gun tube between striker 28 and seat 78. Striker 28 displaces in a reverse direction towards seat 78 under action of the vacuum pressure. After striker 28 is properly seated, vacuum pump ceases operation and vacuum valve 38 is closed. Test assembly 10 can be used for a subsequent test by repeating steps 202, 204, 206, 208, 210, and 212.

Optionally, test shock response spectra can be validated in step 214. Validation of test shock response spectra can include comparing test shock response spectra to a criterion or criteria. For instance, validation of a single degree of freedom can include comparing test response spectra in one of the longitudinal, lateral, and vertical directions to a corresponding upper limit spectrum and lower limit spectrum. If the test response spectrum for a given degree of freedom is less than or equal to the upper spectrum and greater than or equal to the corresponding lower spectrum over at least a target percentage of a test frequency band, the test response spectrum is representative of an actual shock event, thus validating the test. In some instances, the shock test is validated if the test shock response spectrum falls between upper limit spectra and lower limit spectra for at least seventy-five percent of a test frequency band. In other examples, the shock test is validated if the test shock response spectrum falls between upper limit spectra and lower limit spectra for at least ninety percent of a test frequency band (e.g., a frequency band from 100 Hz to 100,000 Hz)

Discussion of Possible Embodiments

The following are non-exclusive descriptions of possible embodiments of the present invention.

Test Assembly for Performing a Shock Test

An assembly for shock testing an article, among other possible things, includes a pneumatic gun assembly, a Hopkinson bar assembly, a ferrous end plate, and a magnetic catch. The pneumatic gun assembly includes a reservoir, a gun tube with a discharge end, a seat spaced from the discharge end and within the gun tube, and a striker disposed within the gun tube. The striker abuts the seat in a pre-fire condition. The Hopkinson bar assembly includes a multi-section shaft extending a linear length from an input end to an output end. The input end abuts the discharge end of the gun tube. The magnetic catch couples the ferrous end plate to the output end of the multi-section shaft in a pre-fire condition.

The assembly of the preceding paragraph can optionally include, additionally and/or alternatively, any one or more of the following features, configurations and/or additional components.

A further embodiment of the foregoing assembly, wherein the Hopkinson bar assembly can include a stationary structure, a first mount, and a second mount. The second mount is spaced along the linear length of the multi-section shaft. The first mount and the second mount isolate radial displacement of the multi-section shaft from the stationary structure.

A further embodiment of any of the foregoing assemblies, wherein the multi-section shaft can include a plurality of disk sections and a plurality of cylindrical sections.

A further embodiment of any of the foregoing assemblies, wherein the first mount and the second mount can circumscribe respective cylindrical sections of the multi-section shaft.

A further embodiment of any of the foregoing assemblies, wherein each of the first mount and the second mount can be axially retained between respective pairs of disk sections.

A further embodiment of any of the foregoing assemblies, wherein the multi-section shaft can include, in axial sequential order, a first disk section, a first cylindrical section, a second disk section, a second cylindrical section, a third disk section, a third cylindrical section, a fourth disk section, and a fourth cylindrical section.

A further embodiment of any of the foregoing assemblies, wherein the first mount can be axially retained between the first disk section and the section disk section and can circumscribe the first cylindrical section.

A further embodiment of any of the foregoing assemblies, wherein the second mount can be axially retained between the third disk section and the fourth disk section and can circumscribe the third cylindrical section.

A further embodiment of any of the foregoing assemblies, wherein the magnetic catch can include an annular support frame, a plurality of bars, and a plurality of magnets.

A further embodiment of any of the foregoing assemblies, wherein the plurality of magnets can couple the magnetic catch to the ferrous end plate.

A further embodiment of any of the foregoing assemblies, wherein the annular support frame of the magnetic catch can include a first end ring, a second end ring, and a plurality of tubes connecting the first end ring to the second end ring.

A further embodiment of any of the foregoing assemblies, wherein each of the bars can be received within one of the plurality of tubes.

A further embodiment of any of the foregoing assemblies, wherein the pneumatic gun assembly further can include a vacuum valve in fluid communication with gun tube at a location between the seat and the reservoir.

Method for Performing a Shock Test

A method for shock testing an article, among other possible things, includes coupling a magnetic catch to a ferrous end plate. The ferrous end plate is attached to an end of the article. The method includes discharging, by a computing device, a pneumatic gun assembly to thereby propel a striker into an input end of a Hopkinson bar assembly. The Hopkinson bar assembly includes a single multi-section shaft. The method includes computing a shock response spectrum based on data received from an accelerometer attached to the article in which the data represents a shock imposed on the article by the striker impacting the Hopkinson bar assembly.

The method of the preceding paragraph can optionally include, additionally and/or alternatively, any one or more of the following features, configurations, additional components, and/or steps.

A further embodiment of the foregoing method can include comparing the shock response spectrum to an upper limit spectrum and a lower limit spectrum.

A further embodiment of any of the foregoing methods can include outputting an indication of shock test acceptance or failure based on a comparison of the shock response spectrum to the upper limit spectrum and the lower limit spectrum.

A further embodiment of any of the foregoing assemblies, wherein the computing device can output an indication of shock test acceptance if the shock response spectrum is less than or equal to the upper limit spectrum and greater than or equal to the lower limit spectrum for greater than or equal to ninety percent of a frequency band of the shock response spectrum.

A further embodiment of any of the foregoing assemblies, wherein the computing device can output an indication of shock test failure if the shock response spectrum is less than or equal to the upper limit spectrum and greater than or equal to the lower limit spectrum for less than ninety percent of the frequency band of the shock response spectrum.

A further embodiment of any of the foregoing assemblies can include suspending the article from first and second rollers.

A further embodiment of any of the foregoing assemblies, wherein a stationary frame can support the first and second rollers such that the rollers guide the article along an axial direction.

A further embodiment of any of the foregoing assemblies can include actuating a vacuum valve to an open position placing the vacuum valve in communication with a gun tube of the pneumatic gun assembly to evacuate gas from the gun tube that draws the striker against a seat of the pneumatic gun assembly.

A further embodiment of any of the foregoing assemblies, wherein discharging the pneumatic gun assembly can include actuating a firing valve to an open position to thereby place a reservoir in communication with a gun barrel of the pneumatic gun assembly.

A further embodiment of any of the foregoing assemblies can include pressurizing the reservoir after discharging the pneumatic gun assembly.

A further embodiment of any of the foregoing assemblies, wherein the method is performed by a computing device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for shock testing an article, the assembly comprising:
a pneumatic gun assembly comprising:
a reservoir;
a gun tube with a discharge end; and
a seat spaced from the discharge end and within the gun tube;
a striker disposed within the gun tube, wherein the striker abuts the seat in a pre-fire condition;
a Hopkinson bar assembly;
a multi-section shaft extending a linear length from an input end to an output end, wherein the input end abuts the discharge end of the gun tube;
a ferrous end plate attached to the article; and
a magnetic catch coupling the ferrous end plate to the output end of the multi-section shaft in a pre-fire condition.

2. The assembly of claim 1, wherein the Hopkinson bar assembly further comprises:
a stationary structure;
a first mount; and
a second mount spaced along the linear length of the multi-section shaft, wherein the first mount and the second mount isolate radial shock loads of the multi-section shaft from the stationary structure.

3. The assembly of claim 2, wherein the multi-section shaft includes a plurality of disk sections and a plurality of cylindrical sections, and wherein the first mount and the second mount circumscribe respective cylindrical sections, and wherein each of the first mount and the second mount are axially retained between respective pairs of disk sections.

4. The assembly of claim 2, wherein the multi-section shaft includes, in axial sequential order, a first disk section a first cylindrical section, a second disk section, a second cylindrical section, a third disk section, a third cylindrical section, a fourth disk section, and a fourth cylindrical section.

5. The assembly of claim 4, wherein the first mount is axially retained between the first disk section and the second disk section and circumscribes the first cylindrical section, and wherein the second mount is axially retained between the third disk section and the fourth disk section and circumscribes the third cylindrical section.

6. The assembly of claim 1, wherein the magnetic catch comprises:
an annular support frame;
a plurality of bars extending from the support frame; and
a plurality of magnets at distal ends of respective bars, wherein the plurality of magnets couple the magnetic catch to the ferrous end plate.

7. The assembly of claim 6, wherein the annular support frame of the magnetic catch comprises:
a first end ring;
a second end ring; and a plurality of tubes connecting the first end ring to the second end ring, wherein each of the bars are received within one of the plurality of tubes.

8. The assembly of claim 1, wherein the pneumatic gun assembly further includes:

a firing valve disposed between the gun tube and the reservoir having a pre-firing position in which the reservoir is blocked from the gun tube and a firing position in which the reservoir discharges through the gun tube.

9. The assembly of claim 1, wherein the pneumatic gun assembly further includes:

a vacuum valve in fluid communication with gun tube at a location between the seat and the reservoir.

10. An assembly comprising:

an support assembly comprising:

a frame;

first and second rollers;

an article suspended from the support frame by the first and second rollers; and a ferrous end plate attached to the article;

a Hopkinson bar assembly comprising:

a multi-section shaft extending a length along a centerline axis from an input end to an output end, wherein the input end abuts the discharge end of the gun tube;

a first mount spaced from a second mount along the centerline axis and retained between major sections of the multi-section shaft and circumscribing respective minor section disposed between axially adjacent major sections; and a stationary structure, wherein the first mount and the second mount isolate shock vibrations of the multi-section shaft from the stationary structure;

a pneumatic gun assembly comprising:

a reservoir configured to contain pressurized gas;

a gun tube fluidly connected to the reservoir comprising a discharge end and a seat spaced from the discharge end;

a valve disposed between the reservoir and the gun tube having a closed position associated with a pre-fire condition and an open position associated with a firing condition; and a striker disposed within the gun tube, wherein the striker abuts the seat in the pre-fire condition; and a magnetic catch coupling the ferrous end plate to the output end of the multi-section shaft in the pre-fire condition, wherein the magnetic catch detaches from the ferrous end plate under a shock load imposed by the striker impacting the input end of the multi-section shaft.

* * * * *